United States Patent [19]

Davenport

[11] Patent Number: 4,788,938

[45] Date of Patent: Dec. 6, 1988

[54] FLOATING SHORELINE AND ACCESSORY HOLDER FOR AQUARIUM/TERRARIUM

[76] Inventor: James S. Davenport, 16713 Walter St., Southgate, Mich. 48195

[21] Appl. No.: 107,777

[22] Filed: Oct. 13, 1987

[51] Int. Cl.⁴ ............................................. A01K 63/00
[52] U.S. Cl. ...................................................... 119/5
[58] Field of Search .............. 119/3, 5; D30/101, 102, D30/103, 104, 105, 106, 107; 446/153

[56] References Cited

U.S. PATENT DOCUMENTS

| | | | |
|---|---|---|---|
| 3,141,442 | 3/1964 | Harris | 119/5 |
| 3,327,686 | 6/1967 | Holden | 119/3 |
| 3,517,649 | 7/1970 | Holden | 119/5 |
| 3,699,921 | 8/1972 | Janicek | 119/5 |
| 3,747,566 | 7/1973 | Lovitz | 119/5 |
| 3,804,064 | 4/1974 | Kuneman | 119/5 |
| 4,081,666 | 3/1978 | Roehrick | 119/5 X |
| 4,133,024 | 1/1979 | Roehrick | 119/5 |
| 4,176,620 | 3/1979 | Kassos | 119/5 |
| 4,413,436 | 11/1983 | Ward et al. | 119/5 X |
| 4,588,618 | 5/1986 | Wolf | 446/153 X |

Primary Examiner—Paul J. Hirsch
Assistant Examiner—R. Thomas Price

[57] ABSTRACT

A floatable aquarium accessory formed to resemble a natural rocky shoreline setting. The invention provides a stable, landscapable, and functional terrestrial surface within the aquarium into which it is inserted. It moves vertically in response to changes in the water level of the aquarium while lateral movement in all directions is restricted by close contact with the interior side walls of the aquarium. The invention conceals the aquarium's water filtration system within removable enclosing members which also resemble natural rock formations. Additionally, it supports the system at the proper position in relation to the water level of the aquarium for its normal operation. The upper terrestrial surface containes a number of depressions for holding aquarium gravel and terrestrial plants. The outflow of water from the water filtration system may be diverted over its enclosing formation. This creates a simulated waterfall which serves as a point of interest for the terrestrial setting while enhancing the aquatic scene below.

19 Claims, 2 Drawing Sheets

FLOATING SHORELINE AND ACCESSORY HOLDER FOR AQUARIUM/TERRARIUM

BACKGROUND OF THE INVENTION

1. Field of the Invention

This invention relates generally to an accessory for a home aquarium and has articular relation to a device which provides a means for creating a two-tiered aquarium/terrarium to accurately depict a natural aquatic shoreline environment within an aquarium.

2. Description of the prior Art

Previous attempts at creating this type of dual environment within aquariums have met with only limited success. These have often involved fixed stationary platforms supporting the terrestrial upper tier. In U.S. Pat. No. 4,176,620 issued to Kassos, a fixed glass platform is incorporated into the construction of the aquarium and forms the base of the terrestrial upper region.

The disadvantages of this design are that the position of the immovable platform hinders routine maintenance of the aquatic lower section. In addition, lighting, filtering, and heating of that section would be difficult using the commercial aquarium accessories currently available.

A further disadvantage is that when viewed from below, the bottom of the fixed platform would resent an unnatural appearance.

Another disadvantage of the fixed platform design is that slight changes in the water level of the lower section due to evaporation, to cause any reptiles or amphibians kept in the tank to become stranded in the aquatic section, unable to climb onto the terrestrial platform above.

A second type of design previously used consists of a small floatable device which is laced in the aquarium providing a means for reptiles and amphibians to climb out of the water. In U.S. Pat. No. 3,141,442 issued to Harris, a buoyant plastic raft is attached to the upper rim of the aquarium with mounting brackets which allow the raft to move vertically in response to any changes in water level while preventing lateral movement or tipping. While this design allows reptiles, amphibians, and the like to be kept in a deep water aquarium, its mounting brackets limit its location to a small region very near the top of the tank. This places the raft in close proximity to lights, filter tubes, hoods, and other aquarium accessories. The poor viewing location severely limits its visual appeal.

For aquarium owners there is presently no device which successfuly recreates a natural shoreline environment within a home aquarium.

SUMMARY OF THE INVENTION

The present invention solves the problems associated with both of these previous designs. The invention relates to a floatable three dimensional structure formed to resemble a natural aquatic shoreline setting. Its upper surface provides a landscapable terrestrial region containing a number of depressions for holding aquarium gravel and terrestrial plants. When inserted into an aquarium, the structure divides the aquarium into a terrestrial upper region and a aquatic lower region. The upper region would house small reptiles or amphibians while the lower region would be suitable for tropical fish and other underwater life forms. Interaction between these two regions occurs at the area of the water's surface not covered by the structure.

The structure moves vertically in response to changes in the water level in the aquarium while its lateral movement is restricted in all directions by close contact between the outside edges of the structure and the interior sides of the aquarium. This design provides a stable platform which can support aquarium accessories at a proper position in relation to the water level in the aquarium for their normal operation. Previously, these accessories, many of which are designed to be mounted at or near the upper rim of the aquarium, had proven to be unsightly or unworkable when used in a two-tiered arrangement.

The present invention provides a means for supporting and concealing aquarium accessory products. In particular, the water filtration system of the aquarium is supported by the structure and completely concealed within enclosing members which resemble natural rock formations. The lower of these members conceals the filtration system at the lower submerged surface of the structure. It contains openings which allow the intake of aquarium water into the system. The upper enclosing member conceals the filtration system at the terrestrial upper surface of the structure and contains an opening through which the outflow of filtered water can be diverted, creating a waterfall, stream, or other scenic effect. This provides a point of interest for the terrestrial region while greatly enhancing the aquatic scene below.

It is an object of the present invention to provide a means for creating a two-tiered aquarium/terrarium within a home aquarium.

It is a further object of the invention to provide a terrestrial surface which responds to the water level in the aquarium, allowing unrestricted interaction between the aquatic and terrestrial regions.

It is still a further object of the invention to accomodate currently available commercial aquarium accessory products.

It is another object of the invention to conceal the normally unsightly water filtration system and use the outflow of filtered water to create an appealing visual display.

Still another object of the present invention is to resemble a natural rocky shoreline setting which presents a realistic appearance from every viewing angle.

Further objects, features, and advantages will become apparent from a consideration of the following description and accompanying drawings.

DRAWING REFERENCE NUMERALS

1—lower half of structure
2—buoyant filler material
3—upper half of structure
4—lower enclosing member
5—filter cartridge holder
6—filter cartridge
7—water pump
8—outflow tubing
9—upper enclosing member 10—intake slits
11—ventilation slits
12—ramp
13—depressions for holding gravel
14—depressions for holding plants
15—opening for water filtration system
16—sides of the aquarium
17—terrestrial upper region
18—aquatic lower region
19—uncovered area of interaction
20—outflow openings

DESCRIPTION OF THE PREFERRED EMBODIMENT

Figure 1:
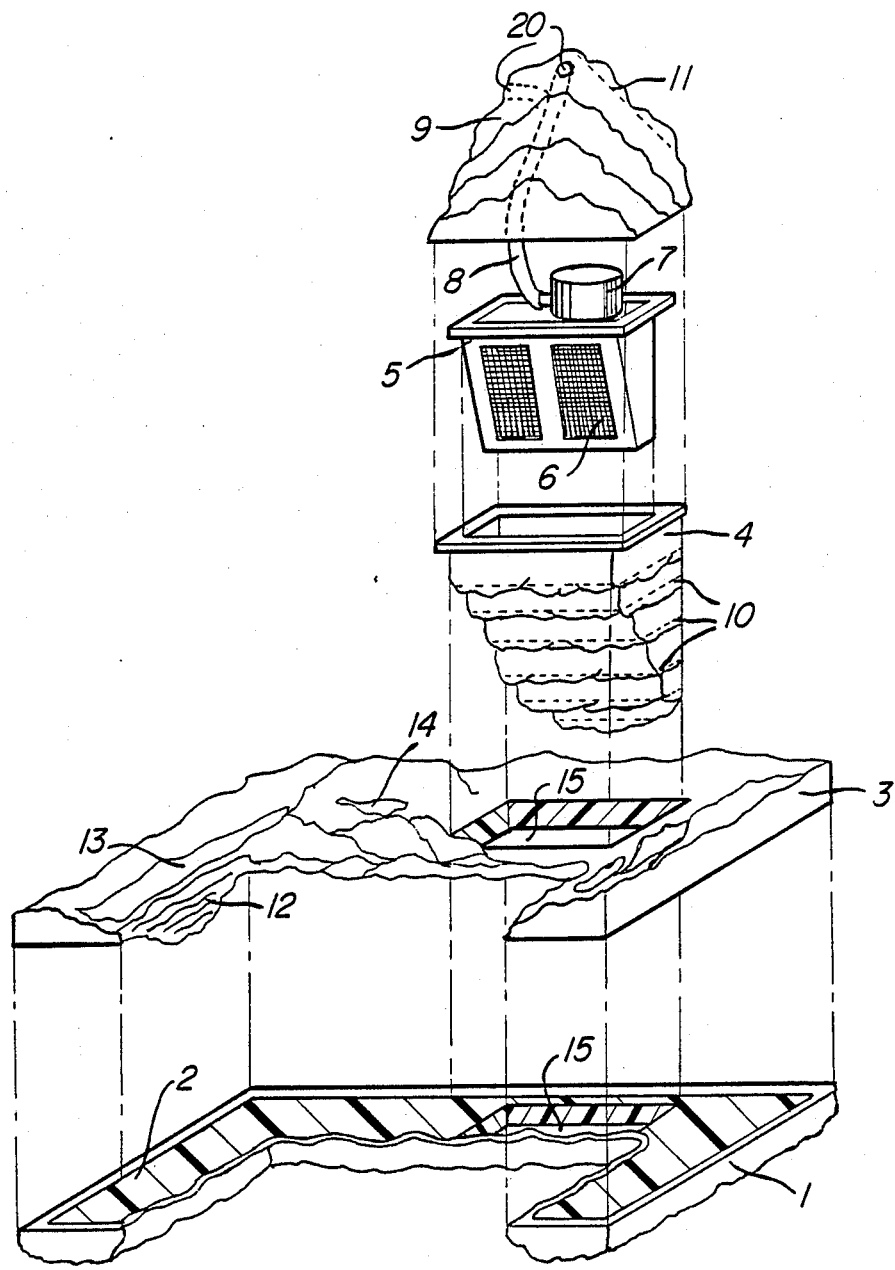
FIG. 1 is an exploded view of the preferred device of the resent invention.
Figure 2:
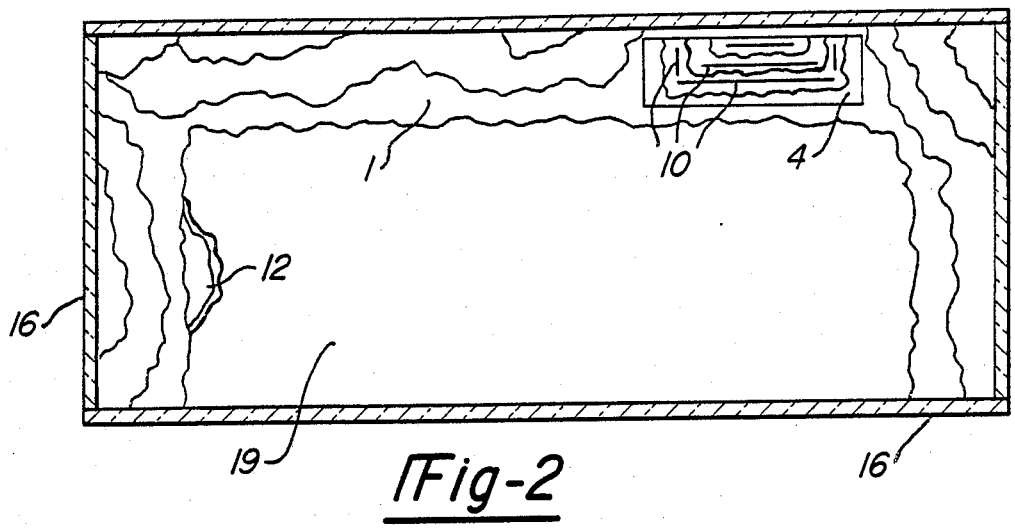
FIG. 2 is a bottom view of the resent invention within an aquarium.
Figure 3:
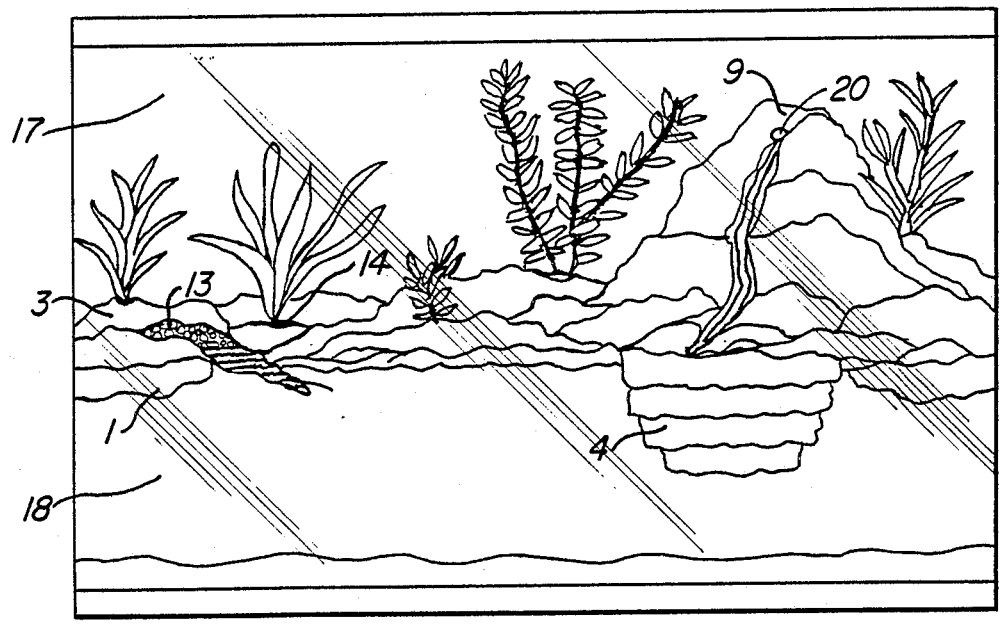
FIG. 3 is a front view of an aquarium illustrating the present invention placed therein.

Referring to FIGS. 1, 2, and 3 an embodiment of the invention is shown in which the floatable structure consists of a thinwalled concave lower half 1 fabricated from a light weight, non-toxic plastic such as polyproylene, and having an exterior surface resembling a natural rock formation. The upper half of the structure 3 is similarly formed and shaped allowing the two halves to be fitted together and the resulting hollow interior to be filled with a buoyant material 2 such as Styrofoam. This method of construction ensures the buoyancy and stability of the structure under all conditions.

The outer peripheral edges of the structure conform closely in shape to the interior sides of the host aquarium 16 as illustrated in FIG. 2. Close contact with the interior sides of the aquarium restrict the lateral and rotational movement of the structure while allowing vertical movement in response to changes in the water level of the aquarium. The shape of the structure creates a large uncovered area 19, in the frontal region of the host aquarium, allowing interaction between the aquatic lower region 18, below the structure and the terrestrial upper region 17, existing at and above the structure's exposed upper surface.

At the rear of the structure and to the right of center is a rectangular opening for the water filtration system 15 extending therethrough. This opening allows the insertion of the lower enclosing member 4 from above As illustrated in FIG. 1 the lower enclosing member is a thin-walled hollow member having an open rectangular shaped rim which protrudes, forming a flange, which serves to support it at the surface of the rectangular opening in the structure through which it is inserted.

When fully inserted, the lower enclosing member extends well below the lower submerged surface of the structure and encloses the lower portion of the aquarium's water filtration system. The bottom portion of the lower enclosing member is also formed to resemble a natural rock formation having a series of inverted horizontal steps along its front and sides. These steps have intake slits 10 along their lower surfaces which allow the passage of aquarium water through the enclosing member and into the water filtration system enclosed therein.

In this embodiment an electric water pump 7 is mounted atop the filter cartridge holder 5 and the filter cartridges 6 therein. The filter cartridge holder is then inserted into the lower enclosing member 4 and is similarly supported by a flange around its upper rim. Aquarium water is drawn through the intake slits 10 in the lower enclosing member and the filter cartridges 6, before passing through the water pump 7 and the outflow tubing 8 on its way back into the aquarium. Other means of water circulation such as an air lift tube operated by an external air pump will perform equally well in conjunction with the present invention.

The upper portion of the water filtration system is concealed by a similarly formed upper enclosing member 9 which fits closely over the outer peripheral edge of the flange of the lower enclosing member 4. The upper enclosing member ha outflow openings 20 through which the flow of filtered water may be diverted over its surface, creating a waterfall or a similar scenic effect. It also has a plurality of ventilation slits 11 , which allow the heat produced by the water pump to escape from within the upper enclosing member.

The upper half of the structure 3 contains one or more depressions 13 for holding aquarium gravel, sand or other decorative materials normally associated with aquariums or terrariums. Deeper such depressions 14 provide a suitable location for small potted terrestrial plants. These natural decorations add to the realism of the upper terrestrial scene, while providing a natural habitat for small reptiles or amphibians. An alternate design for the upper half of the structure would consist of a series of terraces, the upper surfaces of which could be covered with sand or gravel. Additionally, a portion of the upper half of the structure extends below the water level creating a ramp 12, having a rough textured surface which allows small amphibious creatures to move easily between the aquatic and terrestrial regions.

Thus the reader will see that the aquarium accessory of this invention provides a means for creating a two-tiered aquarium/terrarium within a home aquarium. The invention works in conjunction with standard aquarium accessory products to produce a realistic dual environment which presents a natural and aesthetically appealing appearance from every viewing angle.

Although the invention has been shown in connection with a certain specific embodiment, it will be readily apparent to those skilled in the art that various changes in form and arrangement of parts may be made to suit requirements without departing from the spirit and scope of the invention which is defined by the following claims.

I claim:

1. A device which divides an aquarium into an upper terrarium compartment and a lower aquarium compartment comprising a floatable structure inserted into said aquarium, and having exterior peripheral walls which are in slidable engagement with a plurality of interior lateral walls of said aquarium, said exterior peripheral walls of said floatable structure having sufficient height and simultaneously engaging a sufficient number of said interior lateral walls of said aquarium to prevent said floatable structure from tipping or moving in any lateral direction while permitting said floatable structure to move vertically in response to fluctuations in the water level within said aquarium, said floatable structure serving as a stable and non-tippable terrestrial base for said upper terrarium compartment.

2. A device as recited in claim 1, further comprising means for containing and concealing aquarium accessory devices necessary for controlling conditions in said lower aquarium compartment within said floatable structure.

3. A device as recited in claim 2, wherein an outflow of aquarium water from a water circulating device contained within said floatable structure is used to create a waterfall, cascade, or a similar scenic effect within said upper terrarium compartment.

4. A device as recited in claim 3, further comprising a lower enclosing member inserted from above through an opening in said floatable structure, and having a protruding flange around an open upper rim which supports said lower enclosing member at the surface of said opening in said floatable structure, serving to contain said water circulating device and conceal any submerged portion of said water circulating device from view.

5. A device as recited in claim 4, wherein said lower enclosing member has one or more openings which allow aquarium water to pass through said lower enclosing member and into said water circulating device enclosed therein.

6. A device as recited in claim 5, further comprising an upper enclosing member having an open lower rim which fits closely over said protruding flange of said lower enclosing member, serving to conceal any upper portion of said water circulating device from view.

7. A device as recited in claim 6, wherein said upper enclosing member has one or more openings which permit an outflow of aquarium water from said water circulating device contained therein.

8. A device as recited in claim 7, wherein an exterior surface of said structure and the exterior surface of said enclosing members is formed to resemble a natural rock formation.

9. A device as recited in claim 8, wherein an exterior upper surface of said floatable structure contains one or more depressions which serve to hold sand, gravel, terrestrial plants, or other decorative materials associated with terrariums or aquariums.

10. A device as recited in claim 9, wherein a portion of said floatable structure extends diagonally downward and terminates below the surface of the water contained in said aquarium, said portion of said floatable structure having a rough textured exterior surface which allows small amphibious creatures to move easily between said lower aquarium compartment and said upper terrarium compartment.

11. A device as recited in claim 10, wherein a hollow interior of said floatable structure is filled with a material such as Styrofoam to ensure buoyancy of said floatable structure under normal conditions.

12. A device which divides an aquarium into an upper terrarium compartment and a lower aquarium compartment comprising a structure inserted into said aquarium, and having an exterior upper surface which serves as a base for said upper terrarium compartment, said structure having means for containing and concealing aquarium accessory devices used for controlling conditions in said lower aquarium compartment within said structure, and using an outflow of aquarium water from a water circulating device contained within said structure to produce a waterfall, cascade, or a similar scenic effect within said upper terrarium compartment.

13. A device as recited in claim 12, further comprising a lower enclosing member inserted from above through an opening in said structure, and having a protruding flange around an open upper rim which supports said lower enclosing member at a surface of said opening in said structure, serving to contain said water circulating device and conceal any submerged portion of said water circulating device from view.

14. A device as recited in claim 13, wherein said lower enclosing member has one or more openings which allow aquarium water to pass through said lower enclosing member and into said water circulating device enclosed therein.

15. A device as recited in claim 14, further comprising an upper enclosing member having an open lower rim which fits closely over said protruding flange of said lower enclosing member, serving to conceal any upper portion of said water circulating device from view.

16. A device as recited in claim 15, wherein said upper enclosing member has one or more openings which permit an outflow of aquarium water from said water circulating device contained therein.

17. A device as recited in claim 16, wherein the exterior surface of said structure and the exterior surface of said enclosing members is formed to resemble a natural rock formation.

18. A device as recited in claim 17, wherein said exterior upper surface of said structure contains one or more depressions which serve to hold sand, gravel, terrestrial plants, or other decorative materials associated with terrariums or aquariums.

19. A device as recited in claim 18, wherein a portion of said structure extends diagonally downward and terminates below the surface of the water in said aquarium, and having a rough textured surface which allows small amphibious creatures to move easily between said lower aquarium compartment and said upper terrarium compartment.

* * * * *